Feb. 16, 1932.     M. K. PARKHURST     1,845,437
MEASURING DEVICE
Filed Dec. 28, 1928
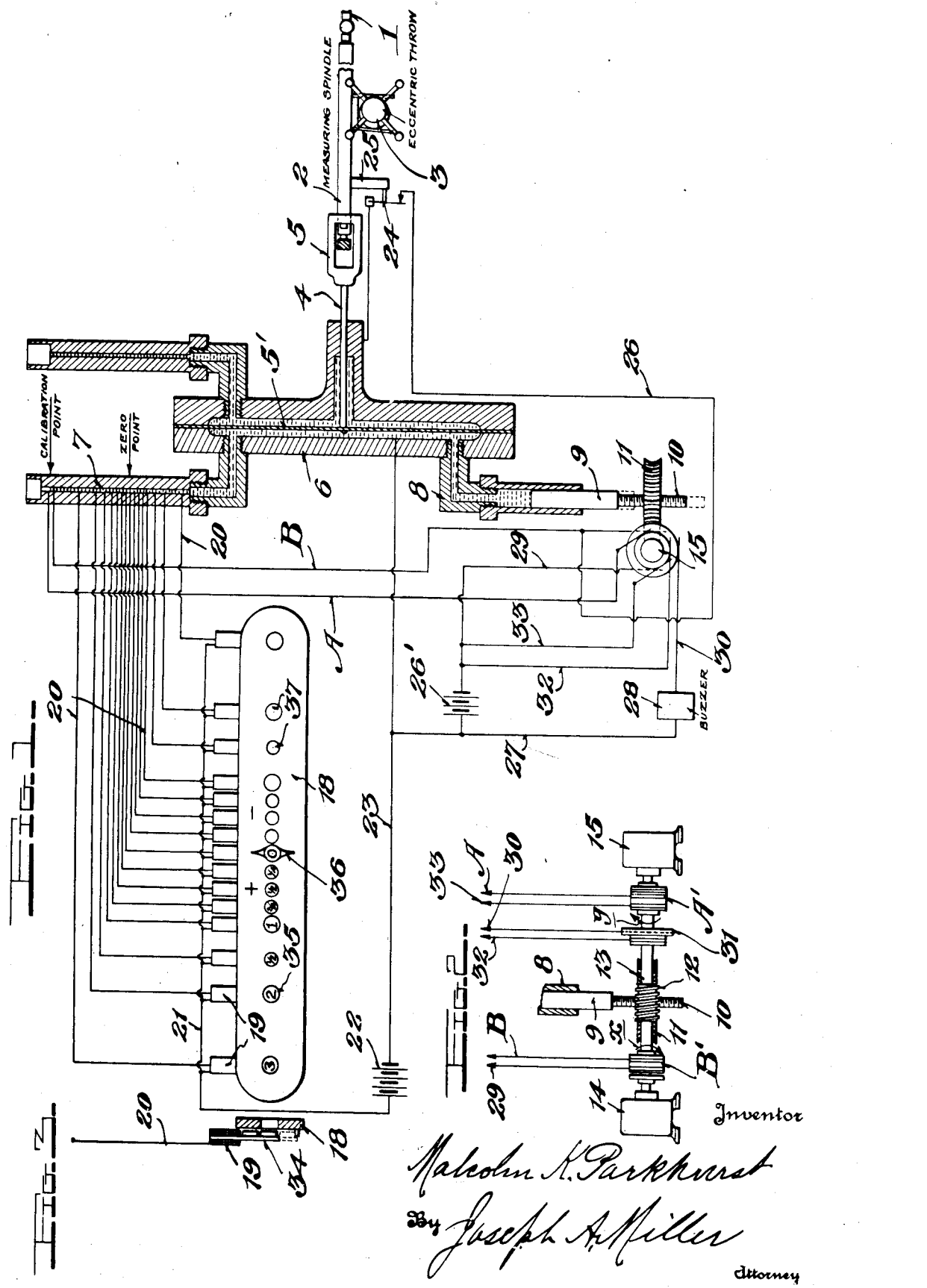

Patented Feb. 16, 1932

1,845,437

UNITED STATES PATENT OFFICE

MALCOLM K. PARKHURST, OF NEW YORK, N. Y., ASSIGNOR TO BROWN & SHARPE MFG. CO., OF PROVIDENCE, RHODE ISLAND

MEASURING DEVICE

Application filed December 28, 1928. Serial No. 328,985.

This invention relates to certain new and useful improvements in measuring devices and the primary object thereof is to provide a measuring device in which the measurements are obtained through the action of a fluid, which latter completes an electrical circuit to indicate the various readings.

In the drawings:

Figure 1 is an elevation of the invention, parts being shown in section;

Figure 2 is a detail view of the driving mechanism, and Figure 3 is a detail view of one of the solenoids and the associated indicator mechanism.

In proceeding in accordance with the present invention, a stationary anvil or point 1 is employed which is opposed to an end of a measuring spindle 2, the latter being operated by an eccentric mechanism 3 toward and away from the point 1, it being understood that the work is engaged between the point 1 and the adjacent end of the measuring spindle 2. The spindle 2 has a rod 4 connected thereto by a yoke 5. The rod 4 is connected to the central point of a diaphragm 5', which latter is mounted within a casing 6 that is filled with liquid or fluid. The casing 6 has a hollow U-shaped member 7 connected to its upper end and in which a part of the fluid or liquid is confined. At its lower end the casing 6 is provided with an angular downwardly extending extension 8 which latter also contains a portion of liquid and has a sliding plunger 9 therein. The plunger 9 has a screw 10 connected thereto which latter extends through the central threaded bore of a worm gear 11, the latter being operated by a worm 12 mounted on a shaft 13. A pair of motors 14 and 15 are connected to the ends of the shaft 13, the latter having a pair of magnetically operated clutches B' and A' thereon for the purpose of connecting and disconnecting the respective motors to and from the worm 12. A meter 18 is provided and has a series of solenoids 19 connected thereto, each solenoid having a wire 20 which is in contact with the liquid in one of the branches or columns of the U-shaped arm 7. A calibration wire A also contacts with the fluid in arm 7 and leads to the clutch A'. A similar calibration wire B contacts with the liquid in arm 7 and leads to the clutch B'. A wire 21 connects each of the solenoids with a battery 22, the latter being connected by a wire 23 to the liquid in the casing 6. A switch 24 is provided and which has a movable arm 25 carried by the spindle 2, the switch being connected by a wire 26 to the wire B, whereby when the spindle is moved rearwardly, the arm 25 thereof will operate switch 24 and open a shunt circuit through the clutch B'. A second battery 26' is provided and which is connected to a wire 27, the latter being in turn connected to a buzzer 28. A wire 29 leads from the battery 26' to the clutch B'. A wire 30 leads from the buzzer to a make and break 31 for the latter, while a wire 32 leads from the battery 26' to the make and break 31. A wire 33 also leads from the battery 26' to the clutch A'.

In operation, the work is positioned between the spindle 2 and the anvil or point 1, whereupon the spindle is moved to engage the work, this movement of the spindle causing the rod 4 to move the diaphragm 5' to the right thereby reducing the pressure of the liquid upon the side of the diaphragm through which the electrical connections are established.

As shown in Figure 3, the solenoids have gravity responsive indicators 34, which latter are visible through the openings 35 in the meter 18, the indicators gravitating when the liquid descends out of contact with the respective wires 20 of the solenoids. In other words, when the circuit on the plus side is broken the indicator will gravitate to show a blank, and if on the minus side will show a numeral.

As shown in the drawings, the fluid is in contact with all of the wires 20, therefore, all of the solenoids are energized and plus readings are had through the plus openings 35. When the diaphragm has been moved to the right, as above set forth, due to movement of the spindle 2 against the work, the fluid descends in the tube or arm 7, and in accordance with the extent of descent, breaks the circuit through the wires 20, until, if the work is accurate, the zero mark will be indicated through the central opening 36.

If the work is less than absolute, the further movement of the spindle will effect opening of the circuit through the minus solenoids, permitting the dropping of the indicators and display thereof through the minus openings 37 the amount in which the work is minus.

It will of course be obvious that to obtain any standardization of readings, a calibration point must be established from which such readings may be commonly started. The contacts of wires A and B are set a slight distance apart and the level of the mercury is adjusted to be in contact with B and out of contact with A before any readings are taken. While the liquid is being so leveled the operator is made aware of it by sounding of the buzzer 28 which operates as long as the shaft 13 rotates. To establish the proper level of the liquid the plunger 9 reciprocates in the container 8 to change and adjust the level. The plunger is geared to the shaft 13 and is operated in an upward direction when motivated by motor 14 and in a downward direction when its force is derived from motor 15. The level of the mercury column of course responds to the movement of the piston 9.

The electrical circuits by virtue of which the above adjustment is made are simple circuits each containing a mercury contact, a magnetically or electrically responsive clutch and a means to open the circuit. In the case of the circuit which causes clutch A' to engage, the latter is connected on one side to battery 26', thence through the mercury by wire 23 to contact A and back to the clutch by wire A. Thus, when the level of the mercury is below A the circuit is open and no motion is imparted to piston 9 because clutch A' is disengaged. In the case of the other motor 14, the clutch is operable only when the circuit is broken. The circuit thus contains two independent means by which it may be broken, the mercury column serving as one and the switch 24 as the second. Thus, the circuit becomes one side of the clutch B' to battery 26' then to contact B at the calibration point, through the mercury to the contact of wire 23 and back to the clutch. A shunt is provided by switch 24 between the battery and the mercury in the above circuit so that this circuit may be kept closed when the mercury is out of contact with B while measurements are being taken. Switch 24 is operated by the spindle 2, being closed when the spindle is moved to the right and open when at its left hand position. The purpose of the shunt is to provide a means to keep the clutch B' inoperative while measurements are being taken. When this circuit is open, that is, the mercury below point B and the spindle at the left position, clutch B' will be actuated and the piston 9 moved up.

Having thus described my invention what I claim as new and desire to secure by Letters Patent is:—

1. In combination with a measuring column containing a conducting liquid, means for controlling the height of the liquid in the column, movable work engaging and measuring means connected to the controlling means to actuate same, a cylinder having a plunger therein communicating with the liquid column, releasable means for operating the plunger in one direction to raise the height of the liquid in the column, other releasable means for operating the plunger in an opposite direction to lower the height of the liquid in the column, independent circuits including said plunger operating means and the liquid for effecting operation of the plunger in either of its directions according to the height of the liquid in the column, a parallel circuit including the plunger operating means which lowers the height of the liquid in the column and means in the parallel circuit operable by the work engaging means to prevent operation of the plunger operating means during a gaging operation.

2. In combination with a measuring column containing a conducting liquid, means for controlling the height of the liquid in the column, movable work engaging and measuring means connected to the controlling means to actuate same, independent means for operating the controlling means in different directions whereby to either raise or lower the height of the liquid in the column, independent circuits including the respective operating means and the liquid for effecting actuation of one of the operating means according to the height of the liquid in the column, a parallel circuit including the operating means which lowers the height of the liquid in the column, and means in the parallel circuit operable by the work engaging means to prevent operation of the operating means during a gaging operation.

3. In combination with a measuring column containing a conducting liquid, means for controlling the height of the liquid in the column, movable work engaging and measuring means connected to the controlling means to actuate same, means for actuating the controlling means to either raise or lower the height of the liquid in the column, electrical connections between the liquid and said actuating means governed by the height of the liquid in the column for operating the actuating means to either raise or lower the height of the liquid column, and means operable by the work engaging means to prevent operation of the actuating means during a gaging operation.

In testimony whereof I have signed my name to this specification.

MALCOLM K. PARKHURST.